US012754275B2

(12) United States Patent
He et al.

(10) Patent No.: US 12,754,275 B2
(45) Date of Patent: Oct. 6, 2026

(54) METHOD AND APPARATUS FOR MEASURING AZIMUTH OF BASE STATION ANTENNA

(71) Applicant: HUAWEI TECHNOLOGIES CO., LTD., Shenzhen (CN)

(72) Inventors: Jinye He, Dongguan (CN); Shangmin Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 18/612,237

(22) Filed: Mar. 21, 2024

(65) Prior Publication Data

US 2024/0230817 A1 Jul. 11, 2024

Related U.S. Application Data

(63) Continuation of application No. PCT/CN2022/121342, filed on Sep. 26, 2022.

(30) Foreign Application Priority Data

Oct. 25, 2021 (CN) ......................... 202111240452.3

(51) Int. Cl.
*G01S 3/30* (2006.01)
*G01S 19/45* (2010.01)

(52) U.S. Cl.
CPC ................ *G01S 3/30* (2013.01); *G01S 19/45* (2013.01)

(58) Field of Classification Search
CPC .................................. G01S 3/30; G01S 19/45
USPC .......................................................... 342/359
See application file for complete search history.

(56) References Cited

U.S. PATENT DOCUMENTS

| | | | | |
|---|---|---|---|---|
| 4,596,989 | A * | 6/1986 | Smith | H01Q 1/18 343/765 |
| 8,160,831 | B1 | 4/2012 | Rausch et al. | |
| 12,176,627 | B2 * | 12/2024 | Manholm | H01Q 1/005 |
| 2006/0181455 | A1 * | 8/2006 | Hudson | H01Q 3/08 342/359 |
| 2013/0127657 | A1 * | 5/2013 | Zhao | G01S 13/06 342/357.2 |
| 2017/0331533 | A1 | 11/2017 | Strong | |

FOREIGN PATENT DOCUMENTS

| | | |
|---|---|---|
| JP | 2001036320 A | 2/2001 |

* cited by examiner

*Primary Examiner* — Brady W Frazier
(74) *Attorney, Agent, or Firm* — Rimon PC

(57) ABSTRACT

This application provides a method for measuring an azimuth of a base station antenna. The method includes: obtaining angular velocity data measured by an angular motion detection apparatus that is stationary relative to a base station antenna, and obtaining a position relationship between a direction of a sensitive axis of the angular motion detection apparatus and a direction of a main lobe of the base station antenna; determining, based on the angular velocity data, a first position relationship between the direction of the sensitive axis of the angular motion detection apparatus and a true north direction; and determining an azimuth of the base station antenna based on the first position relationship and a second position relationship between the direction of the sensitive axis of the angular motion detection apparatus and the direction of the main lobe of the base station antenna.

20 Claims, 12 Drawing Sheets

METHOD AND APPARATUS FOR MEASURING AZIMUTH OF BASE STATION ANTENNA

CROSS-REFERENCE TO RELATED APPLICATIONS

This application is a continuation of International Patent Application No. PCT/CN2022/121342, filed on Sep. 26, 2022, which claims priority to Chinese Patent Application No. 202111240452.3, filed on Oct. 25, 2021. The disclosures of the aforementioned applications are hereby incorporated by reference in their entireties.

TECHNICAL FIELD

This application relates to the field of communication technologies, and in particular, to a method, a medium, an apparatus and a base station for measuring an azimuth of a base station antenna.

BACKGROUND

After a base station antenna is installed, engineering parameters of the base station antenna such as a geographical location, a height, an azimuth, and a downtilt angle of the base station antenna usually need to be collected for network management, coverage performance analysis of the base station antenna, and the like based on these engineering parameters.

To accurately obtain the engineering parameters of the base station antenna, a plurality of receive antenna elements may be disposed on the top of the base station antenna to receive satellite signals sent by a global positioning system (GPS) satellite, and the azimuth of the base station antenna may be obtained based on the obtained satellite signals and a position relationship between the plurality of receive antenna elements. However, an obstacle near a base station, for example, another antenna, an eave, a landscaping tree branch, or a building, affects accuracy of the satellite signals received by the receive antenna elements. This affects measurement precision of the azimuth of the base station antenna. In addition, to avoid reduced precision due to high-power electromagnetic radiation caused to the receive antenna element, when the receive antenna element is set up and the base station antenna is installed, the receive antenna element and the base station antenna need to be kept away from a main lobe of electromagnetic radiation. This reduces flexibility of designing the base station antenna and causes higher difficulty in installing the base station antenna.

SUMMARY

In view of this, embodiments of this application provide a method, a medium, an apparatus and a base station for measuring an azimuth of a base station antenna. An azimuth of a base station antenna is obtained via an angular motion detection apparatus. In this way, an obstacle and/or electromagnetic radiation near the base station may be prevented from affecting measurement precision of the azimuth of the base station antenna, so that flexibility of designing the base station antenna is improved, and difficulty in installing the base station antenna is reduced.

According to a first aspect, an embodiment of this application provides a method for measuring an azimuth of a base station antenna. The method includes: obtaining angular velocity data measured by an angular motion detection apparatus that is stationary relative to a base station antenna, and determining, based on the angular velocity data, a first position relationship between a direction of a sensitive axis of the angular motion detection apparatus and a true north direction; and determining an azimuth of the base station antenna based on the first position relationship and a second position relationship, where the second position relationship is a position relationship between the direction of the sensitive axis of the angular motion detection apparatus and a direction of a main lobe of the base station antenna.

In other words, in some embodiments of this application, the angular velocity data measured by the angular motion detection apparatus that is stationary relative to the base station antenna in an Earth rotation process may be obtained, to determine the first position relationship between the direction of the sensitive axis of the angular motion detection apparatus and the true north direction, for example, an included angle between the direction of the sensitive axis of the angular motion detection apparatus and the true north direction. Then, an included angle between a projection of the direction of the main lobe of the base station antenna on the horizontal plane and the true north direction, namely, the azimuth of the base station antenna, may be determined based on the position relationship between the direction of the sensitive axis of the angular motion detection apparatus and the direction of the main lobe of the base station antenna, for example, the included angle between the projection of the direction of the main lobe of the base station antenna on the horizontal plane and the direction of the sensitive axis of the angular motion detection apparatus.

According to the method provided in some embodiments of this application, the azimuth of the base station antenna can be accurately measured. Even if there is an obstacle and/or electromagnetic radiation near the base station, measurement precision of the azimuth of the base station antenna is not affected. In addition, because the angular motion detection apparatus does not need to receive a satellite signal, the angular motion detection apparatus may be disposed at various positions on the base station antenna, so that flexibility of designing the base station antenna is improved, and difficulty in installing the base station antenna is reduced.

With reference to the first possible implementation of the first aspect, the sensitive axis of the angular motion detection apparatus is parallel to a horizontal plane of a position on which the base station antenna is located.

In other words, in some embodiments of this application, when the angular motion detection apparatus is disposed, the sensitive axis of the angular motion detection apparatus is disposed in parallel to the horizontal plane of the position of the base station antenna, to ensure that a direction of the angular velocity measured by the angular motion detection apparatus is on the horizontal plane. This helps determine the first position relationship between the direction of the sensitive axis of the angular motion detection apparatus and the true north direction.

With reference to the first possible implementation of the first aspect, in a second possible implementation, the first position relationship between the direction of the sensitive axis of the angular motion detection apparatus and the true north direction is determined by using the following formula:

$$\alpha = \arccos\left(\frac{\omega_n}{\omega_E \cdot \cos\,(\varphi)}\right),$$

where $\alpha$ is an included angle between the direction of the sensitive axis of the angular motion detection apparatus and the true north direction, $\omega_n$ is the angular velocity data measured by the angular motion detection apparatus, $\omega_E$ is an angular velocity of the Earth's rotation, and $\varphi$ is a latitude of a location of the angular motion detection apparatus.

In other words, in some embodiments of this application, the first position relationship between the direction of the sensitive axis of the angular motion detection apparatus and the true north direction is determined based on the angular velocity data $\omega_n$ measured by the angular motion detection apparatus, the angular velocity $\omega_E$ of the Earth's rotation, and the latitude $\varphi$ of the location of the angular motion detection apparatus. The angular velocity $\omega_E$ of the Earth's rotation is a known quantity, for example, $\omega_E=7.292\times10^{-5}$ radians/second. The latitude $\varphi$ of the location of the angular motion detection apparatus may be obtained by using a latitude measurement apparatus when the base station antenna is installed.

With reference to the second possible implementation of the first aspect, in a third possible implementation, the determining of an azimuth of a base station antenna based on the first position relationship and the second position relationship includes: when the direction of the sensitive axis of the angular motion detection apparatus is the same as a direction of a projection of the direction of the main lobe of the base station antenna on the horizontal plane, determining that the azimuth of the base station antenna is $\alpha$; or when there is an included angle $\beta$ between the direction of the sensitive axis of the angular motion detection apparatus and the direction of the projection of the direction of the main lobe of the base station antenna on the horizontal plane, determining that the azimuth of the base station antenna is $\alpha$.

With reference to the first possible implementation of the first aspect, in a fourth possible implementation, the obtaining of the angular velocity data measured by the angular motion detection apparatus that is stationary relative to the base station antenna includes: rotating the angular motion detection apparatus on the horizontal plane to a plurality of preset directions, and obtaining angular velocity data measured when the angular motion detection apparatus is located in each preset direction.

In other words, in some embodiments of this application, a plurality of pieces of angular velocity data measured when the angular motion detection apparatus is located in different directions on the horizontal plane may be obtained, and the first position relationship between the direction of the sensitive axis of the angular motion detection apparatus and the true north direction is determined based on the plurality of pieces of angular velocity data, to improve measurement precision.

With reference to the fourth possible implementation of the first aspect, in a fifth possible implementation, the method further includes: obtaining a third position relationship between each preset direction and the direction of the sensitive axis of the angular motion detection apparatus that is measured before the rotation of the angular motion detection apparatus.

With reference to the fifth possible implementation of the first aspect, in a sixth possible implementation, the determining, based on the angular velocity data, of the first position relationship between a direction of the sensitive axis of the angular motion detection apparatus and a true north direction includes: determining, based on the third position relationship and the angular velocity data, the first position relationship between the direction of the sensitive axis of the angular motion detection apparatus that is measured before the rotation of the angular motion detection apparatus and the true north direction.

In other words, in some embodiments of this application, a plurality of pieces of angular velocity data measured when the angular motion detection apparatus is located in different directions on the horizontal plane may be obtained. In addition, the first position relationship between the direction of the sensitive axis of the angular motion detection apparatus that is measured before the rotation of the angular motion detection apparatus and the true north direction is determined based on the plurality of pieces of angular velocity data and position relationships between directions of the sensitive axis of the angular motion detection apparatus measured when the angular motion detection apparatus is located in the foregoing different directions and the direction of the sensitive axis of the angular motion detection apparatus that is measured before the rotation of the angular motion detection apparatus.

With reference to the sixth possible implementation of the first aspect, in a seventh possible implementation, the foregoing plurality of preset directions include: a first preset direction that is the same as the direction of the sensitive axis of the angular motion detection apparatus that is measured before the rotation of the angular motion detection apparatus; a second preset direction that forms a counterclockwise included angle of 90° with the first preset direction; a third preset direction that forms a counterclockwise included angle of 180° with the first preset direction; and a fourth preset direction that forms a counterclockwise included angle of 270° with the first preset direction.

With reference to the seventh possible implementation of the first aspect, in an eighth possible implementation, the first position relationship between the direction of the sensitive axis of the angular motion detection apparatus and the true north direction is determined by using the following formula:

$$\alpha = \arctan\left(\frac{\omega_{n3} - \omega_{n1}}{\omega_n - \omega_{n2}}\right),$$

where $\alpha$ is an included angle between the direction of the sensitive axis of the angular motion detection apparatus and the true north direction, $\omega_n$ is angular velocity data of the angular motion detection apparatus in the first preset direction, $\omega_{n1}$ is angular velocity data of the angular motion detection apparatus in the second preset direction, $\omega_{n2}$ is angular velocity data of the angular motion detection apparatus in the third preset direction, and $\omega_{n3}$ is angular velocity data of the angular motion detection apparatus in the fourth preset direction.

In other words, in some embodiments of this application, the first position relationship between the direction of the sensitive axis of the angular motion detection apparatus and the true north direction may be determined based on the angular velocity data measured when the angular motion detection apparatus is located in the first preset direction, the second preset direction, the third preset direction, and the fourth preset direction. The angular velocity of the Earth's rotation and the latitude of the location of the base station antenna are not required, thereby further improving measurement precision of the azimuth of the base station antenna. In addition, the method provided in some embodiments of this application can further mitigate impact of drift of the angular motion detection apparatus on a measurement result.

With reference to the eighth possible implementation of the first aspect, in a ninth possible implementation, the determining of an azimuth of the base station antenna based on the first position relationship and the second position relationship includes: when the direction of the sensitive axis of the angular motion detection apparatus is the same as the direction of the projection of the direction of the main lobe of the base station antenna on the horizontal plane, determining that the azimuth of the base station antenna is $\alpha$; or when there is an included angle $\beta$ between the direction of the sensitive axis of the angular motion detection apparatus and the direction of the projection of the direction of the main lobe of the base station antenna on the horizontal plane, determining that the azimuth of the base station antenna is $\alpha$.

With reference to the first aspect or any one of the possible implementations of the first aspect, in a tenth possible implementation, the angular motion detection apparatus is disposed on the base station antenna.

With reference to the first aspect or any one of the possible implementations of the first aspect, in an eleventh possible implementation, the angular motion detection apparatus includes a gyroscope.

According to a second aspect, an embodiment of this application provides a readable medium, where the readable medium stores instructions, and when the instructions are executed on an electronic device, the electronic device is enabled to implement any method for measuring an azimuth of a base station antenna according to the first aspect and the possible implementations of the first aspect.

According to a third aspect, an embodiment of this application provides an apparatus for measuring an azimuth of a base station antenna. The measurement apparatus includes: a memory, configured to store instructions executed by one or more processors of the measurement apparatus; and a processor, where the processor is one of processors of the measurement apparatus, and is configured to run the instructions, so that the measurement apparatus is enabled to implement any method for measuring an azimuth of a base station antenna according to the first aspect and the possible implementations of the first aspect.

According to a fourth aspect, an embodiment of this application provides an apparatus for measuring an azimuth of a base station antenna. The measurement apparatus includes: an angular motion detection apparatus; a memory, configured to store instructions executed by one or more processors of the measurement apparatus; and a processor, where the processor is one of processors of the measurement apparatus, and is configured to run the instructions, so that the measurement apparatus is enabled to implement, based on angular velocity data measured by the angular motion detection apparatus, any method for measuring an azimuth of a base station antenna according to the first aspect and the possible implementations of the first aspect.

According to a fifth aspect, an embodiment of this application provides a base station antenna. The base station antenna includes: an angular motion detection apparatus; a memory, configured to store instructions executed by one or more processors of the base station antenna; and a processor, where the processor is one of processors of the base station antenna, and is configured to run the instructions to obtain angular velocity data from the angular motion detection apparatus, to measure an azimuth of the base station antenna by using any method for measuring an azimuth of a base station antenna according to the first aspect and the possible implementations of the first aspect.

According to a sixth aspect, an embodiment of this application provides a base station. The base station includes: at least one base station antenna; at least one angular motion detection apparatus; a memory, configured to store instructions executed by one or more processors of the base station; and a processor, where the processor is one of processors of the base station, and is configured to run the instructions to obtain angular velocity data from the at least one angular motion detection apparatus, to measure an azimuth of the at least one base station antenna by using any method for measuring an azimuth of a base station antenna according to the first aspect and the possible implementations of the first aspect.

DESCRIPTION OF EMBODIMENTS

Illustrative embodiments of this application include but are not limited to a base station antenna, a method and an apparatus for measuring an azimuth of a base station antenna, a medium, and a base station.

Figure 1A:
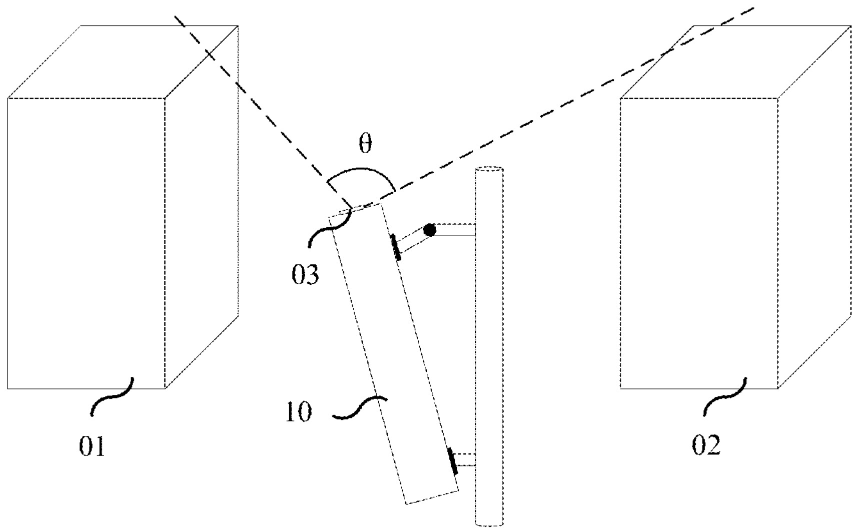
FIG. 1A is a schematic diagram of a scenario in which a building affects measurement of an azimuth of a base station antenna according to some embodiments of this application.
Figure 1B:
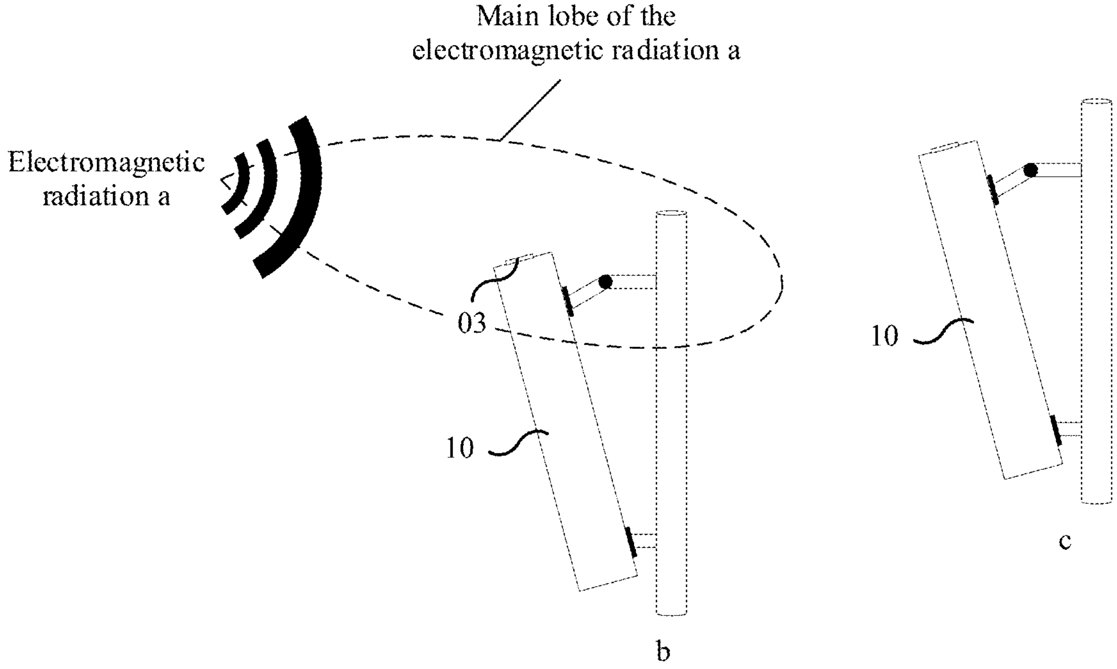
FIG. 1B is a schematic diagram of a scenario in which electromagnetic radiation affects measurement of an azimuth of a base station antenna according to some embodiments of this application.

As described above, when an azimuth of a base station antenna is determined by obtaining satellite signals of a GPS satellite, an obstacle and electromagnetic radiation near the base station affect measurement precision of the azimuth of the base station antenna (namely, an included angle between a true north direction and a projection of a direction of a main lobe of the base station antenna on a horizontal plane). For example, refer to FIG. 1A. There is a building 01 and a building 02 near the base station, and an included angle between the top of the building 01 and a connection line of a receive antenna element 03 and between the top of the building 02 and a connection line of a receive antenna element 03 is θ. When θ is excessively small, the receive antenna element 03 may receive a relatively small quantity of satellite signals sent by the GPS satellite, resulting in relatively low precision of an azimuth of a base station antenna 10 obtained based on the obtained satellite signals. For another example, refer to FIG. 1B. To mitigate impact of electromagnetic radiation of the base station antenna 10 on the receive antenna element 03, the receive antenna element 03 needs to be disposed on the top of the base station antenna 10. In addition, in the case of electromagnetic radiation a, if the base station is installed at a position of a point b, the receive antenna element 03 is located in an area of a main lobe of the electromagnetic radiation a. This reduces accuracy of the satellite signal received by the receive antenna element 03, and affects measurement precision of the azimuth of the base station antenna 10. To avoid impact of the electromagnetic radiation a on the receive antenna element 03, the base station needs to be installed in an area away from the main lobe of the electromagnetic radiation a, for example, installed at a position of a point c in FIG. 1B. This reduces design flexibility of the base station antenna, and increases difficulty in installing the base station antenna.

It may be understood that an intersection line between a true meridian plane of a point on the ground and the surface of the Earth is a true meridian, and a direction in which a tangent of the true meridian at the point points to the north pole is a true north direction.

It may be understood that a direction of a main lobe of the base station antenna is a direction in which radiation intensity of the base station antenna is the largest.

To resolve the foregoing problem, an embodiment of this application provides a method for measuring an azimuth of a base station antenna. The azimuth of the base station antenna does not need to be determined by receiving a signal from a GPS satellite, but is measured by using an angular motion detection apparatus, for example, a gyroscope, stationary relative to the base station antenna. Angular velocity data of the gyroscope in an Earth rotation process may be obtained, and an included angle between a direction of a sensitive axis of the gyroscope and a true north direction is determined based on a relationship between the angular velocity data and an angular velocity of the Earth's rotation. Then an included angle between a projection of a direction of a main lobe of the base station antenna on a horizontal plane and the true north direction, namely, the azimuth of the base station antenna, may be determined based on a position relationship between the direction of the sensitive axis of the gyroscope and the direction of the main lobe of the base station antenna. According to the method provided in some embodiments of this application, the azimuth of the base station antenna can be accurately measured. Even if there is an obstacle and/or electromagnetic radiation near the base station, measurement precision of the azimuth of the base station antenna is not affected. In addition, because the gyroscope does not need to receive a satellite signal, the gyroscope may be disposed at various positions on the base station antenna, so that flexibility of designing the base station antenna is improved and difficulty in installing the base station antenna is reduced.

It can be understood that the angular motion detection apparatus is an apparatus that can measure angular velocity data of at least one sensitive axis (namely, a rotation axis of an angular motion that can be measured by the angular motion detection apparatus) in a process in which the angular motion detection apparatus rotates with the Earth. A direction of the angular velocity data measured by the angular motion detection apparatus is the same as the direction of the sensitive axis of the angular motion detection apparatus. In some embodiments, the angular motion detection apparatus may include a gyroscope. In some other embodiments, the angular motion detection apparatus may also be another apparatus, for example, an angular motion detection apparatus made according to a principle of a gyroscope. This is not limited herein. For ease of description, the following describes an angular motion detection apparatus as a gyroscope.

For ease of understanding the technical solutions in embodiments of this application, a structure of a base station system is first described.

Figure 2:
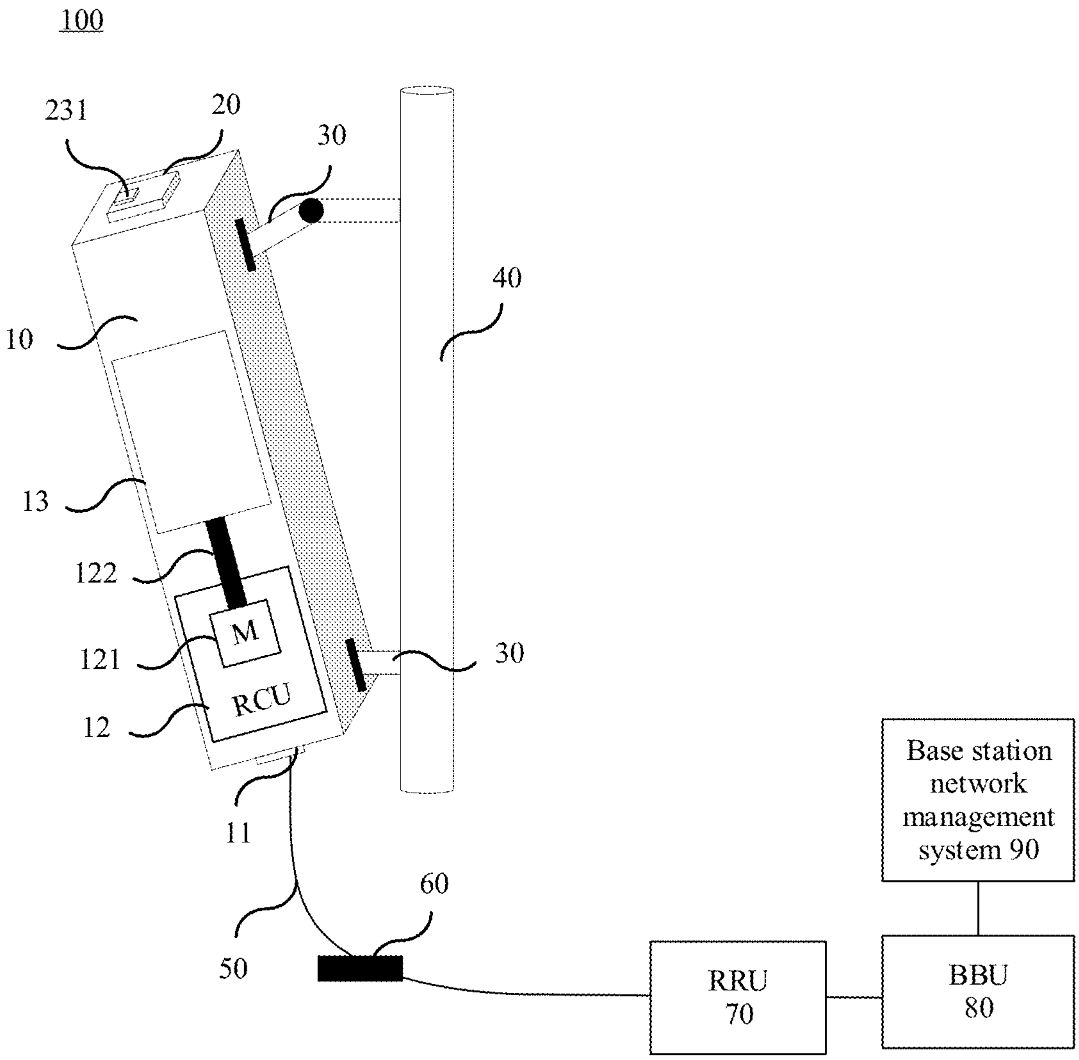
FIG. 2 is a schematic diagram of a structure of a base station system 100 according to some embodiments of this application.

FIG. 2 is a schematic diagram of a structure of a base station system 100 according to some embodiments of this application. As shown in FIG. 2, the base station system 100 includes a base station antenna 10, an AISU 20 disposed on the top of the base station antenna 10, a pole 40, a connection structure 30 configured to connect the base station antenna 10 and the pole 40, a cable 50, a grounding apparatus 60, a remote radio unit (RRU) 70, a building baseband unit (BBU) 80, and a base station network management system 90.

The base station antenna 10 is configured to receive and send a received electromagnetic wave, to implement data exchange between a terminal device and the RRU 70.

In some embodiments, the base station antenna 10 further includes an RCU 12 and a phase shifter 13. The RCU 12 may include at least one motor 121. The motor 121 may be connected to the phase shifter 13 through a transmission apparatus 122, so that the RCU 12 may control, by using the motor 121, the phase shifter 13 to adjust parameters of the base station antenna 10, such as a downtilt angle and an azimuth.

In some other embodiments, the RCU 12 may be coupled to the AISU 20, the RRU 70, and the like, so that the AISU 20 or the RRU 70 may drive the motor 121 of the RCU 12 to rotate. Therefore, a gyroscope 231 coupled to the motor 121 is driven to rotate on a horizontal plane.

It may be understood that, in some embodiments, the base station system 100 may include a plurality of base station antennas 10. This is not limited herein.

The AISU 20 is configured to measure engineering parameters of the base station antenna 10, including but not limited to a geographical location, a height, an azimuth, a downtilt angle, and the like of the base station antenna 10. In some embodiments, refer to FIG. 3A. The AISU 20 may include a processor 21, a memory 22, a sensor module 23, an interface module 24, a power module 25, and the like.

The processor 21 may include one or more processing units, for example, a processing module or a processing circuit including a central processing unit (CPU), a digital signal processor (DSP), a microprocessor (MCU), an Artificial Intelligence (AI) processor, or a field programmable gate array (FPGA). In some embodiments, the processor 21 may be configured to execute instructions to determine an azimuth of the base station antenna 10 based on the measured angular velocity data of the gyroscope 231.

The memory 22 may be configured to store one or more of data, a software program, and a module. The memory 22 may be a volatile memory such as a random access memory (RAM), may be a non-volatile memory such as a read-only memory (ROM), a flash memory, a hard disk drive (HDD), or a solid state drive (SSD), may be a combination of the foregoing types of memories, or may be a removable storage medium such as a secure digital (SD) storage card. In some embodiments, the memory 22 may be configured to store measurement data of each sensor in the sensor module 23, for example, the measured angular velocity data of the gyroscope 231, angular velocity data of the Earth's rotation, and latitude data of the base station system 100.

The sensor module 23 may include a gyroscope 231 and another sensor for measuring another parameter, for example, a sensor for measuring an altitude and a latitude. The gyroscope 231 is an apparatus that may be configured to measure an angular motion. In some embodiments, when the gyroscope 231 is disposed, a direction of a sensitive axis of the gyroscope 231 may be disposed in parallel to a horizontal plane of a position of the base station system 100, so that it can be ensured that a direction of an angular velocity measured by the gyroscope 231 is on the horizontal plane.

It may be understood that, in some embodiments, the gyroscope 231 may be a single-axis MEMS gyroscope, so that development costs of the base station system 100 can be reduced. In some other embodiments, the gyroscope 231 may be a multi-axis MEMS gyroscope, or may be another type of gyroscope, for example, a laser gyroscope or an optical fiber gyroscope. This is not limited in this embodiment of this application.

It may be understood that, in some embodiments, the gyroscope 231 may not be disposed in the AISU 20, but may be disposed at another position of the antenna 10, for example, in the RCU 12 of the base station antenna 10. In some other embodiments, the gyroscope 231 may be alternatively disposed at a position other than the base station antenna 10, for example, on the pole 40. This is not limited herein.

The interface module 24 may include various communication interfaces, for example, an antenna interface standards group (AISG) interface 241, so that the AISU 20 may communicate with another electronic device through the interface module 24, for example, transmit an azimuth of the base station antenna 10 to the other electronic device through the antenna interface standards group, AISG interface 241.

The power module 25 is configured to supply power to the processor 21, the memory 22, the sensor module 23, the interface module 24, and the like.

Figure 3A:
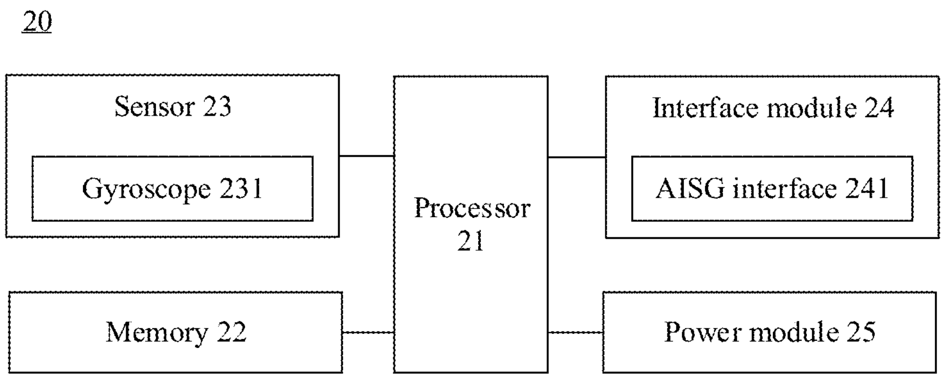
FIG. 3A is a schematic diagram of a structure of an antenna information sensor unit (AISU) 20 according to some embodiments of this application.
Figure 3B:
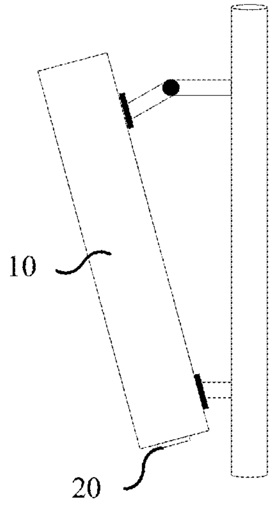
FIG. 3B to FIG. 3E are schematic diagrams of installing an AISU 20 at different positions on a base station antenna 10 according to some embodiments of this application.
Figure 3C:
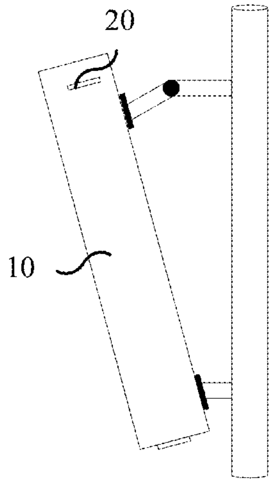
Figure 3D:
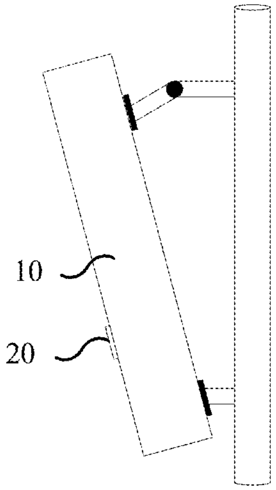
Figure 3E:
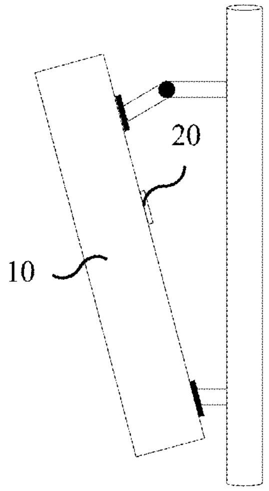

It may be understood that a structure of the AISU 20 shown in FIG. 3A is merely an example. In some other embodiments, the AISU 20 may include more or fewer modules, or may split or combine some modules. This is not limited herein.

It may be understood that, in some embodiments, the AISU 20 may be disposed on the top of the base station antenna 10. In some other embodiments, the AISU 20 may also be disposed at another position of the base station antenna 10. For example, refer to FIG. 3B to FIG. 3E. The AISU 20 may be disposed at the bottom, the inside, the left side, the right side, or the like of the base station antenna 10. This is not limited in this embodiment of this application.

The connection structure 30 is configured to fasten the base station antenna 10 to the pole 40. The pole 40 is configured to fasten the base station antenna 10.

The cable 50 may include a radio frequency cable, an AISG cable, and the like. The radio frequency cable is configured to couple the base station antenna 10 and the RRU 70, so that the base station antenna 10 may transmit received data to the RRU 70, and data of the RRU 70 may also be transmitted to the base station antenna 10. In some embodiments, the AISG cable is configured to couple the AISU 20 and the RRU 70, so that the AISU 20 can transmit an angular velocity measured by the gyroscope 231 and/or an azimuth of the base station antenna 10 to the RRU 70. In addition, in some embodiments, the cable 50 may be sealed with the base station antenna 10 by using a sealing structure 11, so that waterproof and dustproof performance of the base station antenna 10 can be improved.

It may be understood that, in some other embodiments, the cable 50 may further include more or fewer cables. For example, the cable 50 may further include a cable configured to couple the RCU 12 and the RRU 70, a cable configured to couple the AISU 20 and the RCU 12, and the like. This is not limited herein.

The grounding apparatus 60 is configured to ground the base station antenna 10 and the like, to reduce electromagnetic interference.

The RRU 70 may be configured to receive and send a radio frequency signal and perform conversion between a radio frequency signal and a baseband signal. In some embodiments, the RRU 70 may further transmit the azimuth of the base station antenna 10 obtained by the AISU 20 to the BBU 80, and then the azimuth is transmitted to the base station network management system 90, so that a user can remotely monitor the azimuth of the base station antenna 10 by using the base station network management system 90.

The BBU 80 is mainly configured to perform baseband signal processing, control a network device, and the like. In some embodiments, the BBU 80 may receive the azimuth of the base station antenna 10 from the RRU 70, and transmit the azimuth to the base station network management system, so that a user can monitor and adjust the azimuth of the base station antenna 10.

The base station network management system 90 may be a remote management device of an operator, and is configured to monitor a status of a base station antenna, for example, monitor the azimuth of the base station antenna 10, and remind a user and/or automatically adjust the azimuth of the base station antenna 10 when the azimuth changes. For example, in some embodiments, if the base station network management system 90 detects that change of the azimuth of the base station antenna 10 exceeds a threshold, the base station network management system 90 may prompt the user that the base station antenna 10 may be faulty, so that the user can perform subsequent processing in time, for example, notify a skilled person to survey and maintain the base station antenna 10.

It may be understood that the structure of the base station system 100 shown in FIG. 2 is merely an example. In some other embodiments, the base station system 100 may further include more or fewer modules, or may combine or split some modules. This is not limited herein.

The following describes the technical solutions in embodiments of this application with reference to the structure of the base station system 100.

Figure 4:
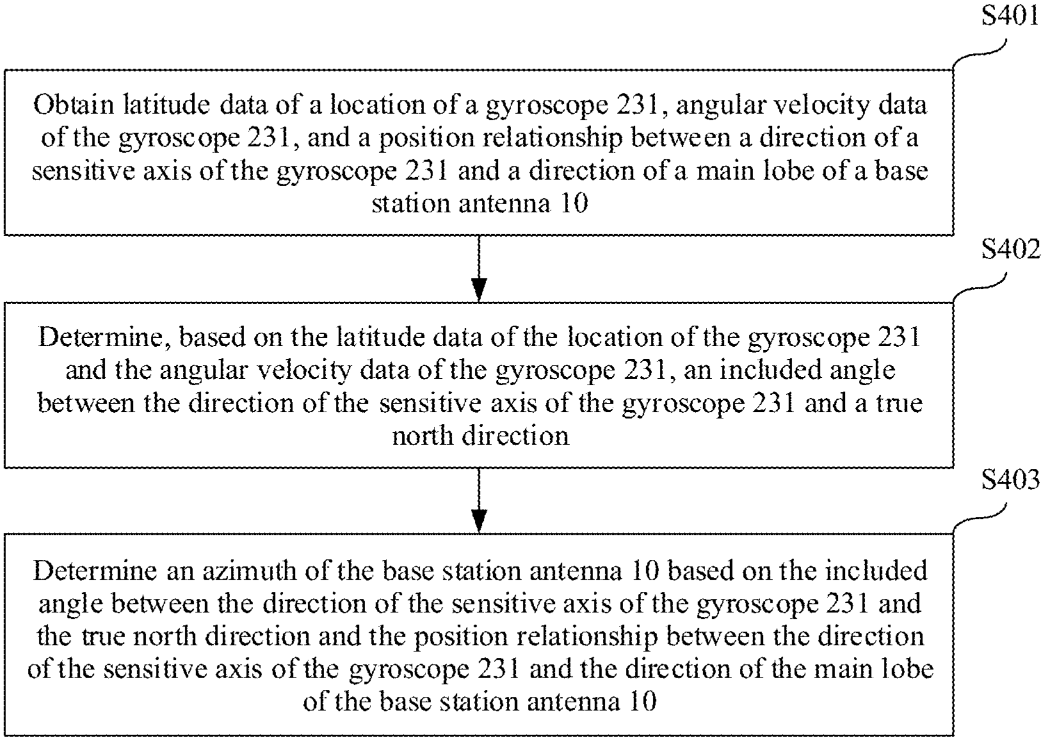
FIG. 4 is a schematic flowchart of a method for measuring an azimuth of a base station antenna according to some embodiments of this application.

FIG. 4 is a schematic flowchart of a method for measuring an azimuth of a base station antenna according to some embodiments of this application. The method is performed by an AISU 20. As shown in FIG. 4, the procedure includes the following steps.

S401: Obtain latitude data of a location of a gyroscope 231, angular velocity data of the gyroscope 231, and a position relationship between a direction of a sensitive axis of the gyroscope 231 and a direction of a main lobe of a base station antenna 10.

In some embodiments, the AISU 20 may obtain, from a memory 22, latitude data of a location of a base station system 100 that is measured in advance, and use the latitude data as the latitude data of the location of the gyroscope 231. In some other embodiments, the AISU 20 may alternatively obtain the latitude data of a location of the gyroscope 231 that is obtained by another module, for example, a sensor that can measure a latitude. This is not limited herein.

The position relationship between the direction of the sensitive axis of the gyroscope 231 and the direction of the main lobe of the base station antenna 10 may be determined when the gyroscope 231 is installed and is stored in a memory of the AISU 20. In some embodiments, for ease of calculation, the direction of the sensitive axis of the gyroscope 231 may be set to be the same as a direction of a component of the direction of the main lobe of the base station antenna 10 on a horizontal plane.

In some embodiments, the gyroscope 231 may be disposed on the base station antenna 10 to help determine the position relationship between the direction of the sensitive axis of the gyroscope 231 and the direction of the main lobe of the base station antenna 10.

S402: Determine, based on the latitude data of the location of the gyroscope 231 and the angular velocity data of the gyroscope 231, an included angle between the direction of the sensitive axis of the gyroscope 231 and a true north direction.

Figure 5A:
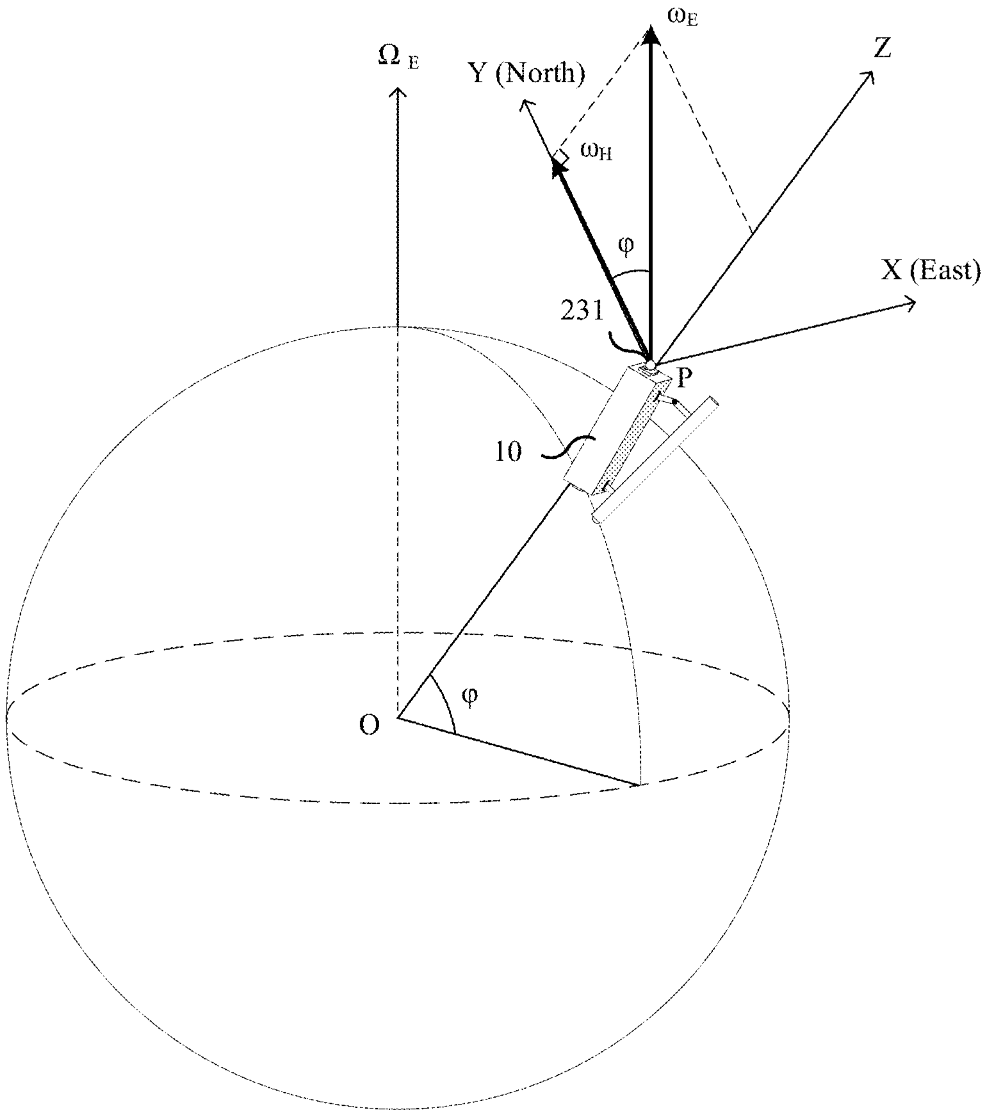
FIG. 5A is a schematic diagram of a component of an angular velocity of the Earth's rotation on a horizontal plane according to some embodiments of this application.
Figure 5B:
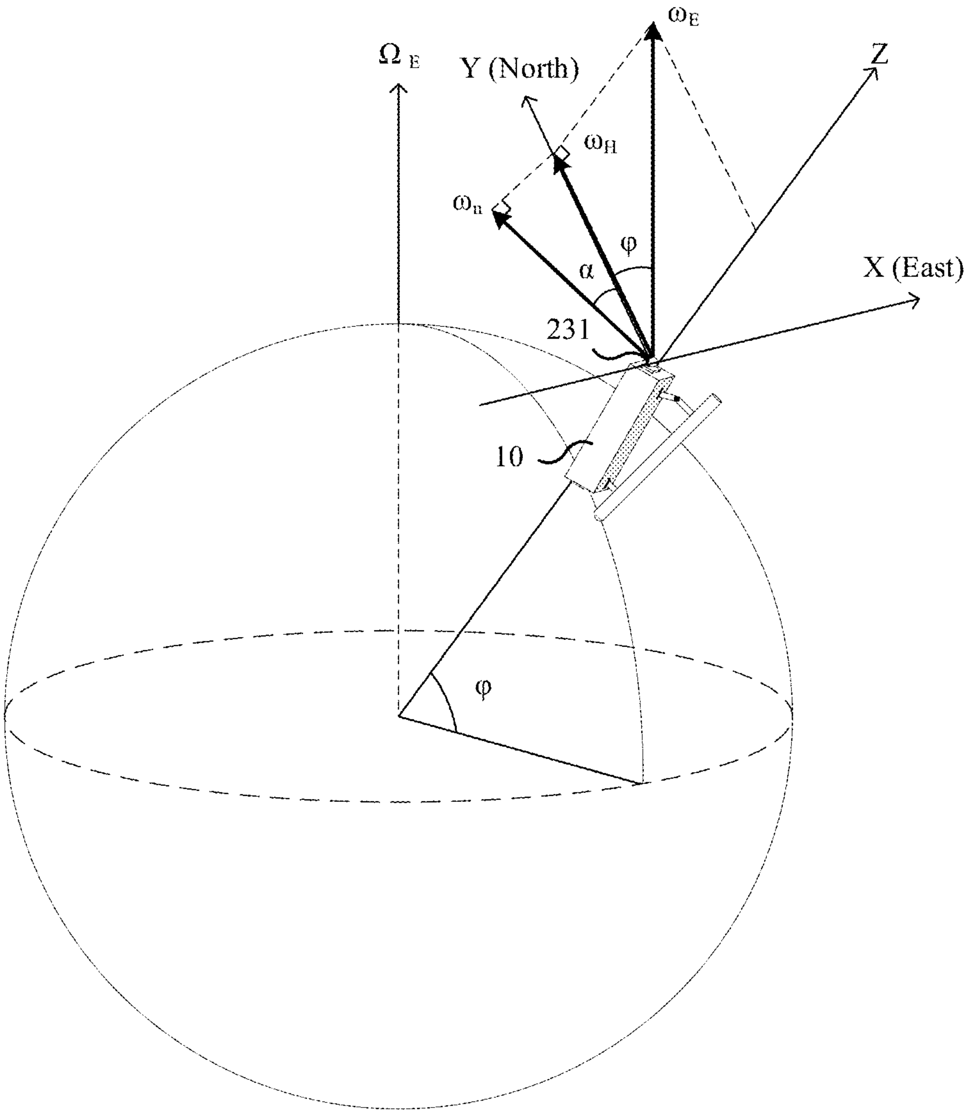
FIG. 5B is a schematic diagram of a relationship between angular velocity data of a gyroscope 231 and a component of an angular velocity of the Earth's rotation on a horizontal plane according to some embodiments of this application.

FIG. 5A is a schematic diagram of a component of an angular velocity of the Earth's rotation on a horizontal plane according to some embodiments of this application. FIG. 5B is a schematic diagram of a relationship between angular velocity data of a gyroscope 231 and a component of an angular velocity of the Earth's rotation on a horizontal plane according to some embodiments of this application. With reference to FIG. 5A and FIG. 5B, the following describes a process of determining, based on the latitude data of the location of the gyroscope 231 and the angular velocity data of the gyroscope 231, the included angle between the direction of the sensitive axis of the gyroscope 231 and the true north direction.

Refer to FIG. 5A. A coordinate system P-XYZ is established, and uses a position P of the gyroscope 231 as an origin, the east of the position as an X-axis, a true north direction of the position as a Y-axis, and a vertical direction of the position as a Z-axis. An XY plane is a horizontal plane at the position P. In other words, the direction of the sensitive axis of the gyroscope 231 is parallel to the XY plane. In addition, $\Omega_E$ in FIG. 5A is a rotation axis of the Earth.

In the coordinate system P-XYZ shown in FIG. 5A, a direction of an angular velocity $\omega_E$ of the Earth's rotation is parallel to the rotation axis $\Omega_E$ of the Earth. According to an angular velocity resolution principle, a component $\omega_H$ of the angular velocity $\omega_E$ of the Earth's rotation in the true north direction (Y-axis) may be expressed by using the following Formula (1):

$$\omega_H = \omega_E \cdot \cos(\varphi) \tag{1}$$

$\varphi$ is a latitude of the location of the gyroscope 231, and the angular velocity $\omega_E$ of the Earth's rotation is a known quantity, for example, $\omega_E$=7.292×10$^{-5}$ radians/second.

Refer to FIG. 5B. The measured angular velocity data of the gyroscope 231 is $\omega_n$, and an included angle between $\omega_n$ and the true north direction (a direction of Y-axis/$\omega_H$) is $\alpha$. Therefore, a component of $\omega_E$ in the direction of $\omega_n$ is the same as a value of $\omega_n$, and a relationship between $\omega_H$ and $\omega_n$ may be expressed by using the following Formula (2):

$$\omega_n = \omega_H \cdot \cos(\alpha) \tag{2}$$

Based on Formula (1) and Formula (2), the included angle $\alpha$ between the direction of the sensitive axis of the gyroscope 231 and the true north direction may be determined by using the following Formula (3):

$$\alpha = \arccos\left(\frac{\omega_n}{\omega_E \cdot \cos\ (\varphi)}\right) \tag{3}$$

It may be understood that the included angle $\alpha$ between the direction of the sensitive axis of the gyroscope 231 and the true north direction determined by using Formula (3) is merely an example. In some other embodiments, the angular velocity of the Earth's rotation may be decomposed along another direction, and the included angle $\alpha$ between the direction of the sensitive axis of the gyroscope 231 and the true north direction is calculated by using different methods. This is not limited herein.

It may be understood that, in some embodiments, when the direction of the sensitive axis of the gyroscope 231 is not parallel to the horizontal plane, an included angle between the direction of the sensitive axis of the gyroscope 231 and the horizontal plane may be further obtained. For example, the included angle between the direction of the sensitive axis of the gyroscope 231 and the horizontal plane is obtained by using a gradienter. Then, a component of the measured angular velocity data of the gyroscope 231 on the horizontal plane is determined based on the included angle, and an included angle between the component and the true north direction is determined by using Formula (3).

S403: Determine an azimuth of the base station antenna 10 based on the included angle between the direction of the sensitive axis of the gyroscope 231 and the true north direction and the position relationship between the direction of the sensitive axis of the gyroscope 231 and the direction of the main lobe of the base station antenna 10. That is, the AISU 20 determines the azimuth of the base station antenna 10 based on the position relationship between the direction of the sensitive axis of the gyroscope 231 and the direction of the main lobe of the base station antenna 10 and the included angle $\alpha$, obtained in step S402, between the direction of the sensitive axis of the gyroscope 231 and the true north direction.

Figure 6A:
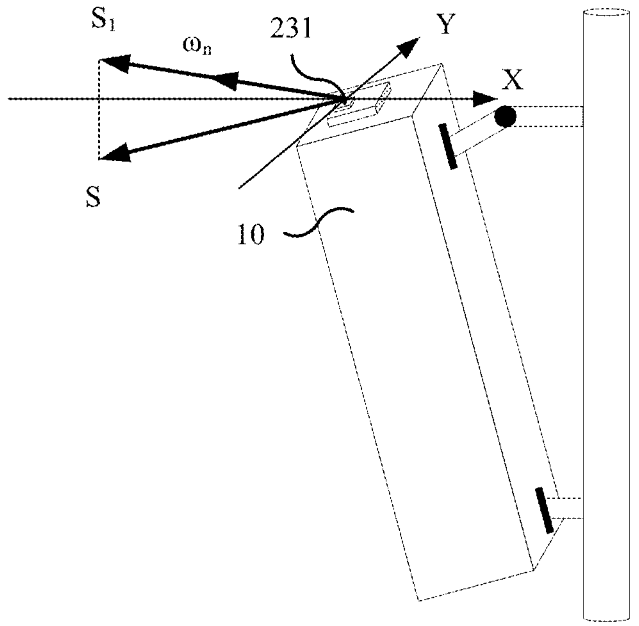
FIG. 6A is a schematic diagram of a position relationship between a direction of a sensitive axis of a gyroscope 231 and a direction of a main lobe of a base station antenna 10 according to some embodiments of this application.

For example, refer to FIG. 6A. In some embodiments, when the direction (that is, a direction of $\omega_n$) of the sensitive axis of the gyroscope 231 is the same as a direction of a projection $S_1$ of the direction S of the main lobe of the base station antenna 10 on the horizontal plane on which the gyroscope 231 is located, the included angle α, determined in step S402, between the direction of the sensitive axis of the gyroscope 231 and the true north direction is the azimuth of the base station antenna 10.

Figure 6B:
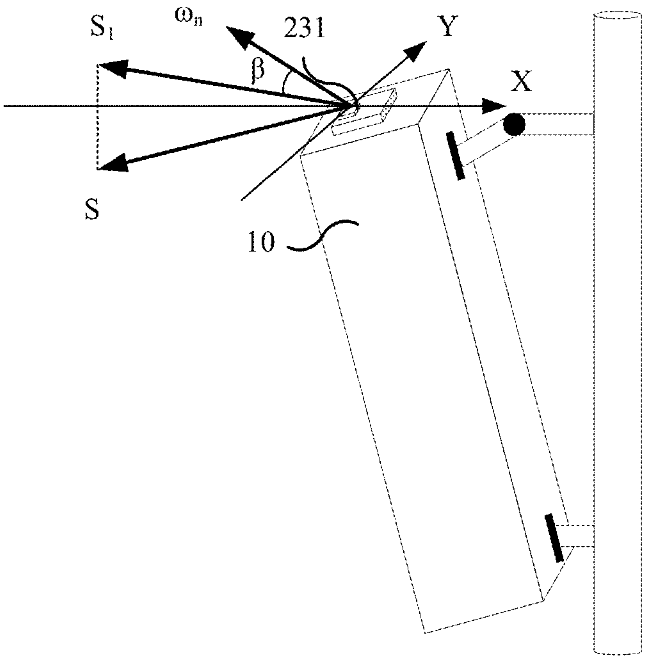
FIG. 6B is a schematic diagram of a position relationship between a direction of a sensitive axis of a gyroscope 231 and a direction of a main lobe of a base station antenna 10 according to some embodiments of this application.

For another example, refer to FIG. 6B. In some embodiments, when the included angle between the direction of the sensitive axis of the gyroscope 231 (that is, the direction of $\omega_n$) and the direction of the projection $S_1$ of the direction S of the main lobe of the base station antenna 10 on the horizontal plane on which the gyroscope 231 is located is β, the azimuth of the base station antenna 10 is α+β.

For another example, in some embodiments, the AISU 20 may determine the azimuth of the base station antenna 10 based on an included angle between the component of the measured angular velocity data of the gyroscope 231 on the horizontal plane and the true north direction, an included angle between the sensitive axis of the gyroscope 231 and the horizontal plane, and the position relationship between the sensitive axis of the gyroscope 231 and the direction of the main lobe of the base station antenna 10.

It may be understood that, in some embodiments, after determining the azimuth of the base station antenna 10, the AISU 20 may transmit the azimuth of the base station antenna 10 to an RRU 70, and then the RRU 70 transmits the azimuth to a base station network management system 90 by using a BBU 80, so that a user can monitor the azimuth of the base station antenna 10 by using the base station network management system 90.

It may be understood that an order of performing step S401 to step S403 is merely an example. In some other embodiments, the order of performing the steps may be changed, or some steps may be split and combined. For example, the position relationship between the direction of the sensitive axis of the gyroscope 231 and the direction of the main lobe of the base station antenna 10 in step S401 may be obtained in step S403. This is not limited herein.

It may be understood that, in some other embodiments, steps S401 to S403 may alternatively be performed by another unit or module. For example, at least one of the RRU 70, the BBU 80, or the base station network management system 90 performs all or some content of the foregoing steps. This is not limited herein.

It may be understood that, in some embodiments, the AISU 20 may alternatively set up the sensitive axis of the gyroscope 231 at different positions, obtain a plurality of azimuths of the base station antenna 10 based on the method provided in step S401 to step S403, and use an average value of the plurality of azimuths as an actual azimuth of the base station antenna 10, to improve measurement precision.

It may be understood that, in some embodiments, the AISU 20 may alternatively obtain angle velocity data of a plurality of gyroscopes, obtain a plurality of azimuths of the base station antenna 10 based on the method provided in step S401 to step S403, and use an average value of the plurality of azimuths as an actual azimuth of the base station antenna 10, to improve measurement precision.

According to the method provided in some embodiments of this application, the AISU 20 may accurately measure the azimuth of the base station antenna. Even if there is an obstacle and/or electromagnetic radiation near the base station, measurement precision of the azimuth of the base station antenna is not affected. In addition, because the gyroscope does not need to receive a satellite signal, the gyroscope may be disposed at various positions on the base station antenna, so that flexibility of designing the base station antenna is improved and difficulty in installing the base station antenna is reduced.

In the foregoing embodiment, in a process of determining the azimuth of the base station antenna 10, the AISU 20 needs to use the latitude data of the location of the gyroscope 231. If the latitude data is not accurate, measurement precision of the azimuth of the base station antenna 10 is directly affected. In view of this, an embodiment of this application further provides a method for measuring an azimuth of a base station antenna. A gyroscope 231 is rotated to a plurality of directions on a horizontal plane, angular velocity data of the gyroscope 231 in each direction is obtained, and then an azimuth of a base station antenna 10 is determined based on the plurality of directions and a position relationship between a direction of a sensitive axis of the gyroscope 231 in a to-be-measured direction of the gyroscope 231 and the base station antenna 10. According to the method provided in some embodiments of this application, the azimuth of the base station antenna 10 can be determined without obtaining latitude data of a location of the gyroscope 231, and impact of a drift error of the gyroscope 231 on a measurement result can be eliminated. In this way, precision of the azimuth of the base station antenna 10 measured by the AISU 20 can be further improved.

Figure 7:
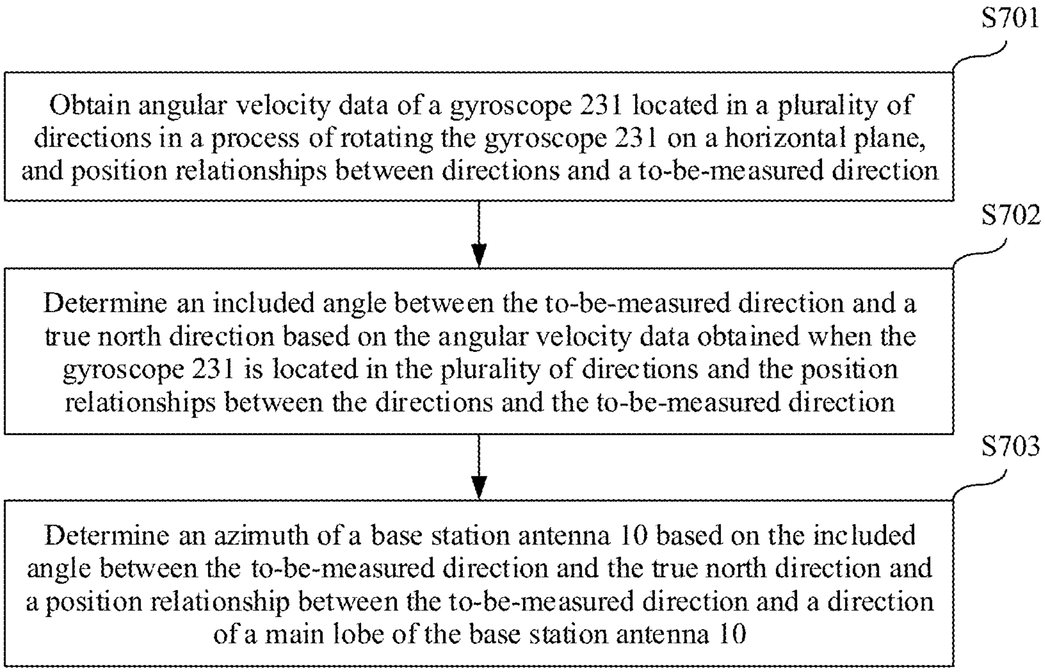
FIG. 7 is a schematic flowchart of a method for measuring an azimuth of a base station antenna according to some embodiments of this application.

FIG. 7 is a schematic flowchart of a method for measuring an azimuth of a base station antenna according to some embodiments of this application. The method is performed by AISU 20. As shown in FIG. 7, the procedure includes the following steps:

S701: Obtain angular velocity data of a gyroscope 231 located in a plurality of directions in a process of rotating the gyroscope 231 on a horizontal plane, and position relationships between directions and a to-be-measured direction. The to-be-measured direction is a direction of a sensitive axis of the gyroscope 232 that is measured before the rotation of the gyroscope 231. The horizontal plane may be a horizontal plane of a position of the gyroscope 231, for example, an XY plane shown in FIG. 5A and FIG. 5B. It may be understood that when the AISU 20 obtains the angular velocity data of the gyroscope 231, the gyroscope 231 is stationary relative to the base station antenna 10. For example, refer to FIG. 8. The AISU 20 may obtain angular velocity data of the gyroscope 231 located in four directions A, B, C, and D shown in the figure, and position relationships between the four directions and the to-be-measured direction shown in the figure. $\omega_n$ is angular velocity data obtained when the gyroscope 231 is located in the to-be-measured direction (the direction A), and an included angle between $\omega_n$ and the true north direction (a Y-axis direction) is α. $\omega_{n1}$ is angular velocity data obtained when the gyroscope 231 is located in the direction B, and a counterclockwise included angle between the direction B and the to-be-measured direction is 90°. $\omega_{n2}$ is angular velocity data obtained when the gyroscope 231 is located in the direction C, and a counterclockwise included angle between the direction C and the to-be-measured direction is 180°. $\omega_{n3}$ is angular velocity data obtained when the gyroscope 231 is located in the direction D, and a counterclockwise included angle between the direction D and the to-be-measured direction is 270°.

In some embodiments, position relationships between the direction B and the to-be-measured direction (the direction A), the direction C and the to-be-measured direction (the direction A), and the direction D and the to-be-measured direction (the direction A), may be obtained by using an encoder of a motor that controls rotation of the gyroscope 231. In some other embodiments, the AISU 20 may alternatively control rotation of the gyroscope 231 based on a plurality of preset directions. For example, the AISU 20 controls the gyroscope 231 to rotate 90°, 180°, and 270° along a counterclockwise direction, so that the gyroscope 231 rotates to the direction B, the direction C, and the direction D. It may be understood that the AISU 20 may further obtain the position relationships between the plurality of directions and the to-be-measured direction in another manner. This is not limited herein.

It may be understood that in some embodiments, after controlling the gyroscope 231 to rotate on the horizontal plane and obtaining the angular velocity data of the gyroscope 231 located in the plurality of directions and the position relationships between the directions and the to-be-measured direction, the AISU 20 may further rotate the gyroscope 231 to the to-be-measured direction, so that a position relationship between the direction of the sensitive axis of the gyroscope 231 and the direction of the main lobe of the base station antenna 10 can be determined when the azimuth of the base station antenna 10 is measured next time. In some other embodiments, after the AISU 20 controls the gyroscope 231 to rotate on the horizontal plane and obtains the angular velocity data of the gyroscope 231 located in the plurality of directions and the position relationships between each direction and the to-be-measured direction, the AISU 20 may further record a position relationship between the direction of the sensitive axis of the gyroscope 231 and the direction of the main lobe of the base station antenna 10 after the gyroscope 231 stops rotating. Therefore, when the azimuth of the base station antenna 10 is measured next time, the azimuth of the base station antenna 10 may be determined based on the recorded position relationship between the direction of the sensitive axis of the gyroscope 231 and the direction of the main lobe of the base station antenna 10.

It may be understood that the foregoing obtaining angular velocity data measured when the gyroscope 231 is located in four directions is merely an example. In some other embodiments, the AISU 20 may alternatively obtain more or fewer pieces of angular velocity data, for example, two pieces, three pieces, or five pieces of angular velocity data. This is not limited herein.

It may be understood that the position relationships between the foregoing four directions and the to-be-measured direction are merely examples. In some other embodiments, the AISU 20 may further obtain angular velocity data when the gyroscope 231 is located in another direction. This is not limited herein.

As described above, the base station antenna 10 may include the RCU 12. To reduce costs, in some embodiments, torque of the motor 121 of the RCU 12 may be transferred to the gyroscope 231 by using a transmission mechanism, to control the gyroscope 231 to rotate on a horizontal plane.

Figure 9A:
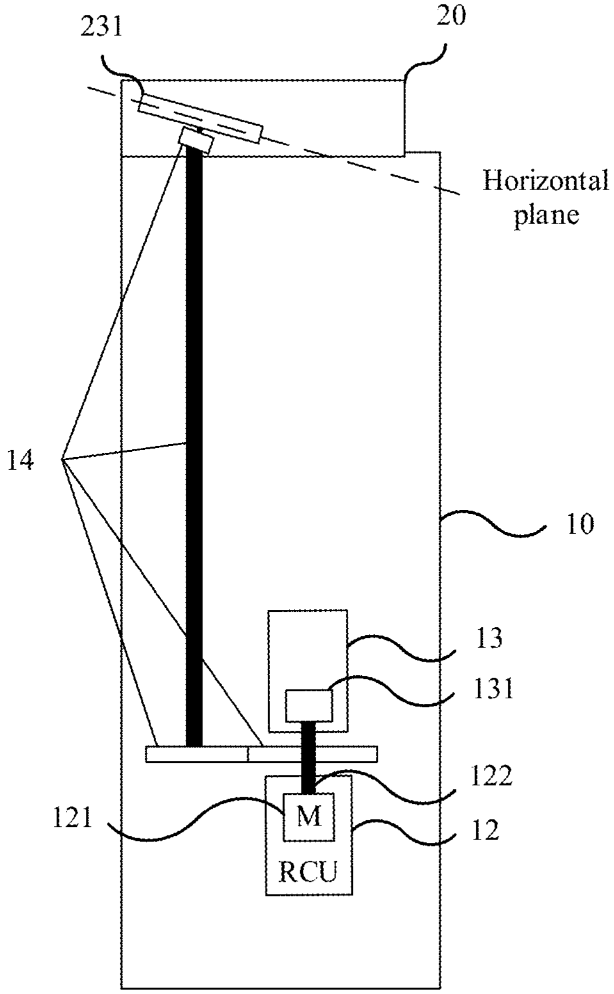
FIG. 9A is a schematic diagram of transferring torque of a motor 121 to a gyroscope 231 by using a transmission mechanism 14 according to some embodiments of this application.
Figure 9B:
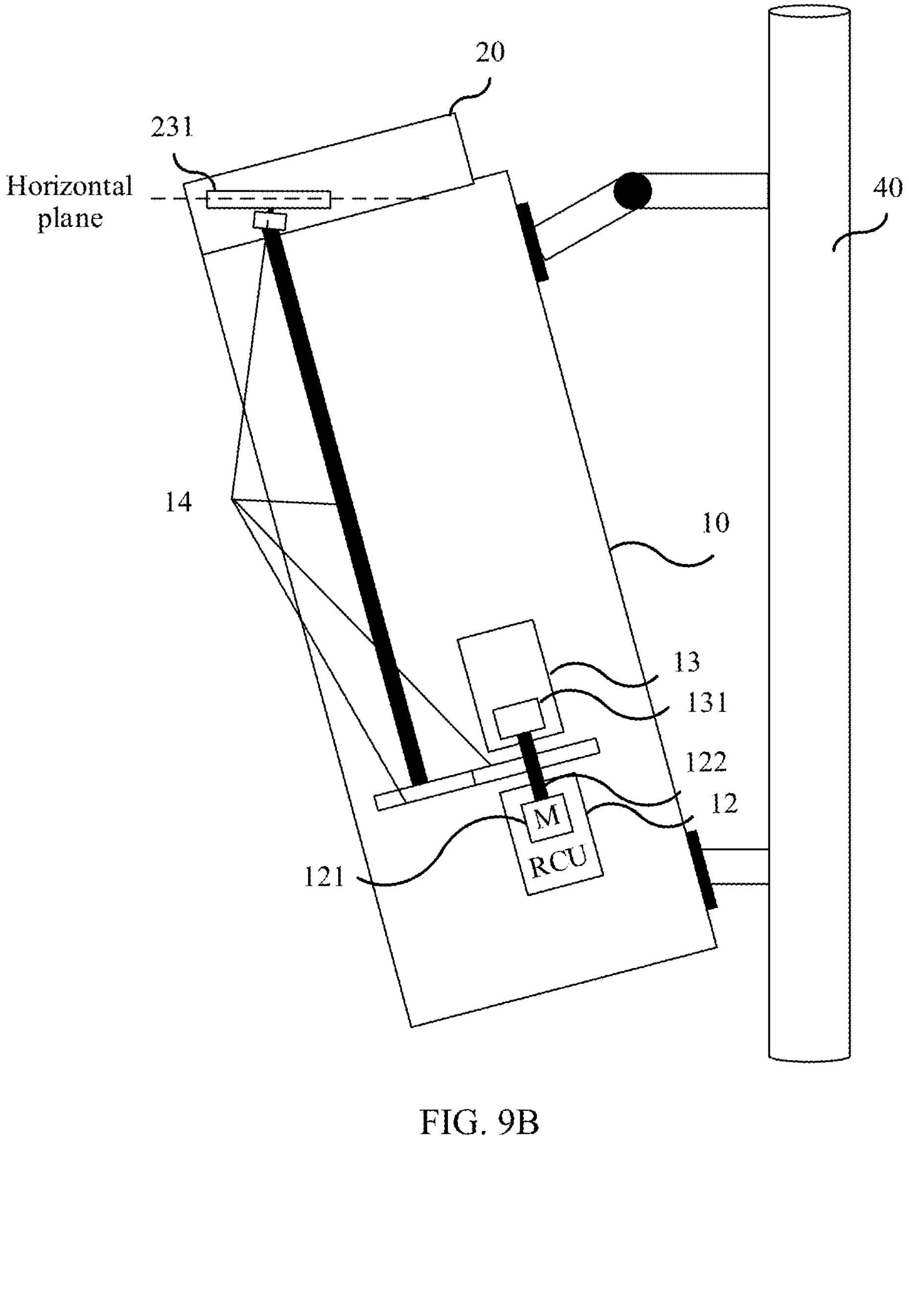
FIG. 9B is a schematic diagram of a base station antenna 10 that includes a transmission mechanism 14 and that is installed on a pole 40 according to some embodiments of this application.

For example, FIG. 9A is a schematic diagram of transferring torque of a motor 121 to a gyroscope 231 by using a transmission mechanism 14 according to some embodiments of this application. FIG. 9B is a schematic diagram of a base station antenna 10 that includes a transmission mechanism and that is installed on a pole 40 according to some embodiments of this application. Refer to FIG. 9A and FIG. 9B. The torque of the motor 121 may be transferred to the gyroscope 231 by using the transmission mechanism 14, to drive the gyroscope 231 to rotate on a horizontal plane. In addition, a gear shifter 131 disposed in the phase shifter 13 may interrupt a transmission relationship between the transmission apparatus 122 and the phase shifter 13 in a process in which the motor 121 drives the gyroscope 231 to rotate, so that the motor 121 does not drive the phase shifter 13 to adjust the parameter of the base station antenna 10 in a process in which the motor 121 drives the gyroscope 231 to rotate.

Figure 10:
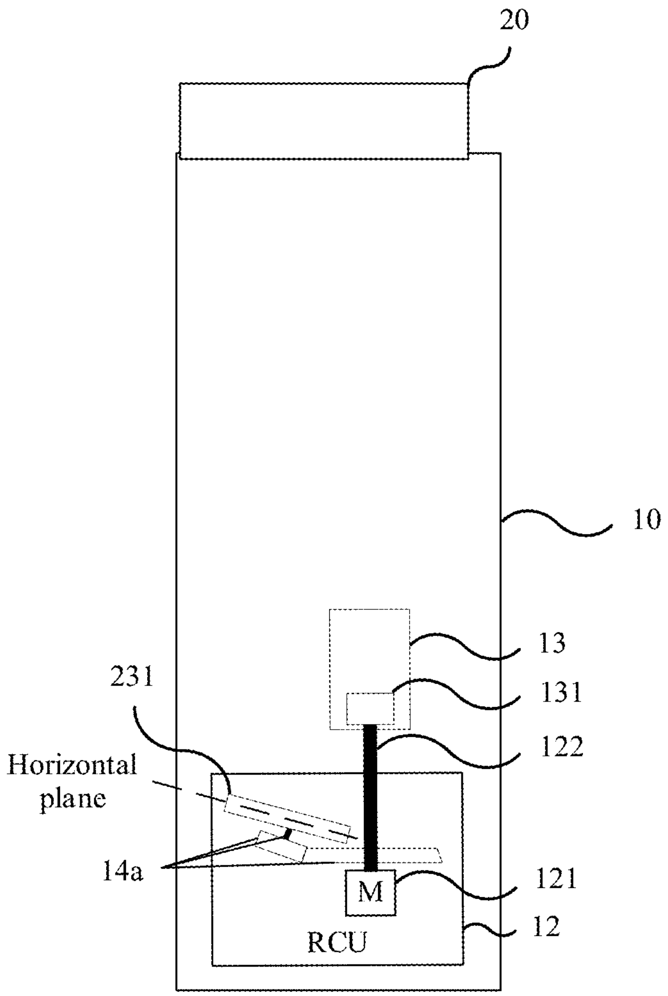
FIG. 10 is a schematic diagram of a gyroscope located in a remote control unit (RCU) 12 of a base station antenna 10 according to some embodiments of this application.

For another example, refer to FIG. 10. In some embodiments, the gyroscope 231 may be further disposed inside the RCU 12, and the torque of the motor 121 is transferred to the gyroscope 231 by using a transmission mechanism 14*a*, to drive the gyroscope 231 to rotate on a horizontal plane. In this way, a volume of the transmission mechanism can be reduced, and hardware costs can be saved.

It may be understood that, in some embodiments, the gear shifter 131 may alternatively be disposed outside the phase shifter 13. This is not limited in this embodiment of this application.

It may be understood that in some embodiments, a motor may be disposed in the AISU 20 to drive the gyroscope 231 to rotate on the horizontal plane. This is not limited in this embodiment of this application.

S702: Determine an included angle between the to-be-measured direction and a true north direction based on the angular velocity data obtained when the gyroscope 231 is located in the plurality of directions and the position relationships between the directions and the to-be-measured direction. That is, the AISU 20 determines the included angle between the to-be-measured direction and the true north direction based on relationships between the angular velocity data obtained when the gyroscope 231 is located in the plurality of directions and the angular velocity of the Earth's rotation and the position relationships between the directions and the to-be-measured direction.

Figure 8:
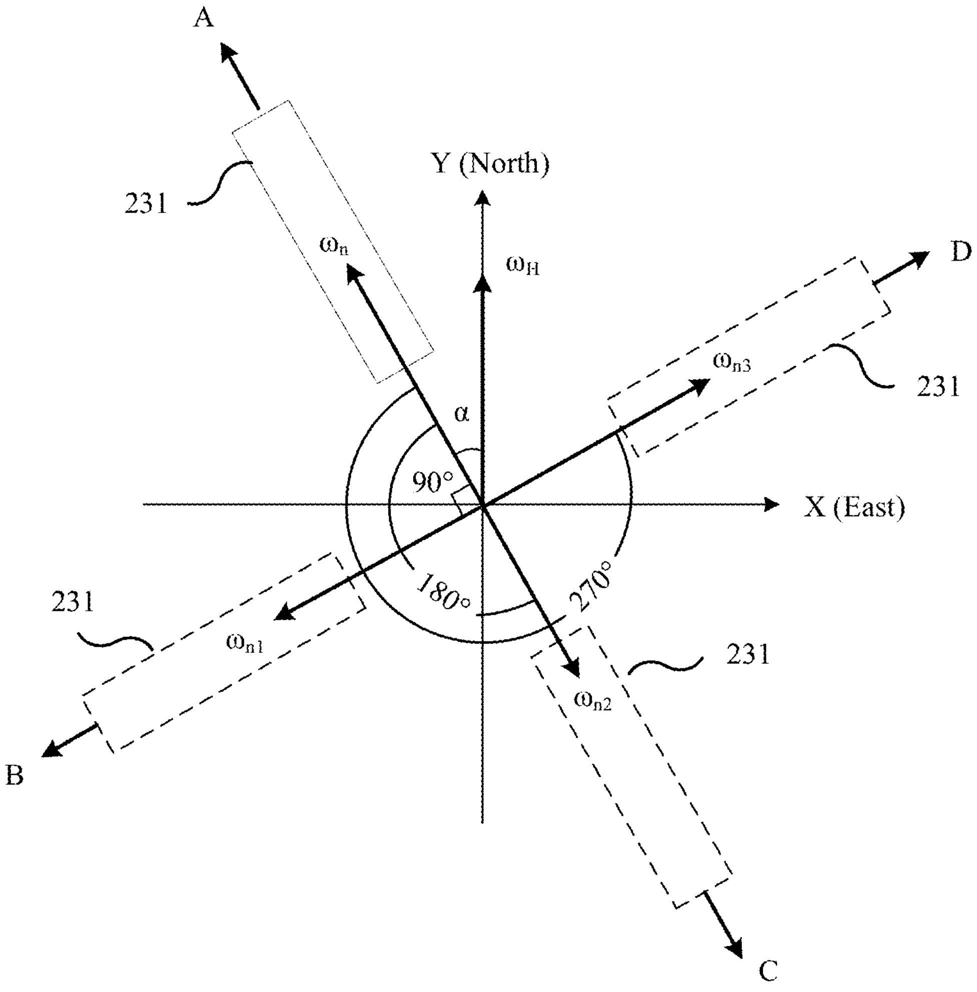
FIG. 8 is a schematic diagram of rotating a gyroscope 231 to different directions on a horizontal plane according to some embodiments of this application.

For example, based on the foregoing Formula (1) and Formula (2), it can be learned that when the gyroscope 231 is located in four directions A, B, C, and D shown in FIG. 8, a relationship between an angular velocity of the gyroscope 231 and an angular velocity $\omega_E$ of the Earth's rotation may be respectively represented by using the following Formula (4) to Formula (7).

$$\omega_n = \omega_E \cdot \cos(\varphi) \cdot \cos(\alpha) + \varepsilon \tag{4}$$

$\omega_n$ is angular velocity data obtained when the gyroscope 231 is located in the direction A (namely, the to-be-measured direction); $\varepsilon$ is a drift error obtained when the gyroscope 231 is located in the direction A; $\omega_E$ is an angular velocity of the Earth's rotation; and $\alpha$ is an included angle between the to-be-measured direction and the true north direction (a Y direction).

$$\omega_{n1} = \omega_E \cdot \cos(\varphi) \cdot \cos(\alpha + 90°) + \varepsilon_1 \tag{5}$$

$\omega_{n1}$ is angular velocity data obtained when the gyroscope 231 is located in the direction B; $\varepsilon_1$ is a drift error obtained when the gyroscope 231 is located in the direction B; $\omega_n$ is an angular velocity of the Earth's rotation; and $\alpha$ is an included angle between the to-be-measured direction and the true north direction (the Y direction).

$$\omega_{n2} = \omega_E \cdot \cos(\varphi) \cdot \cos(\alpha + 180°) + \varepsilon_2 \tag{6}$$

$\omega_{n2}$ is angular velocity data obtained when the gyroscope 231 is located in the direction C; $\varepsilon_2$ is a drift error obtained when the gyroscope 231 is located in the direction C; $\omega_n$ is an angular velocity of the Earth's rotation; and $\alpha$ is an included angle between the to-be-measured direction and the true north direction (the Y direction).

$$\omega_{n3} = \omega_E \cdot \cos(\varphi) \cdot \cos(\alpha + 270°) + \varepsilon_3 \tag{7}$$

$\omega_{n3}$ is angular velocity data obtained when the gyroscope 231 is located in the direction D; $\varepsilon_3$ is a drift error obtained when the gyroscope 231 is located in the direction D; $\omega_n$ is an angular velocity of the Earth's rotation; and $\alpha$ is an included angle between the to-be-measured direction and the true north direction (the Y direction).

Because the time for the gyroscope to rotate from the direction A to the direction D is relatively short, it may be considered that $\varepsilon$, $\varepsilon_1$, $\varepsilon_2$, and $\varepsilon_3$ are the same. By combining the foregoing Formula (4) to Formula (7), a calculation Formula (8) of the included angle $\alpha$ between the to-be-measured direction and the true north direction (the Y direction) may be determined.

$$\alpha = \arctan\left(\frac{\omega_{n3} - \omega_{n1}}{\omega_n - \omega_{n2}}\right) \tag{8}$$

It can be learned from Formula (8) that, calculation of the included angle $\alpha$ between the to-be-measured direction and the true north direction (the Y direction) does not need latitude data of the location of the gyroscope 231 or the angular velocity of the Earth's rotation. Compared with the calculation method in Formula (3), the quantity of variables is reduced, thereby improving calculation precision of the included angle $\alpha$ between the to-be-measured direction and the true north direction (the Y direction), and further improving calculation precision of the azimuth of the base station antenna 10.

It may be understood that the method for calculating the included angle between the to-be-measured direction and the true north direction (the Y direction) determined by using Formula (8) is merely an example. In some embodiments, in a process of combining Formula (4) to Formula (7), $\alpha$ may also be solved by using another trigonometric function. In some other embodiments, if the quantity of obtained angular velocity data is another quantity, another method may be used for calculation. This is not limited in this embodiment of this application.

S703: Determine an azimuth of the base station antenna 10 based on the included angle between the to-be-measured direction and the true north direction and a position relationship between the to-be-measured direction and the direction of the main lobe of the base station antenna 10. That is, the AISU 20 determines the azimuth of the base station antenna 10 based on the included angle $\alpha$ between the to-be-measured direction and the true north direction obtained in step S702 and the position relationship between the to-be-measured direction and the direction of the main lobe of the base station antenna 10.

For example, refer to FIG. 6A. In some embodiments, a direction of a sensitive axis of the gyroscope 231 is set to be consistent with a direction of a projection $S_1$ on a horizontal plane of a direction S of a main lobe of the base station antenna 10, and the included angle $\alpha$ between the to-be-measured direction and the true north direction (the Y direction) is the azimuth of the base station antenna 10.

For another example, refer to FIG. 6B. In some other embodiments, when there is an included angle $\beta$ between the direction of the sensitive axis of the gyroscope 231 and the direction of the projection $S_1$ of the direction S of the main lobe of the base station antenna 10 on the horizontal plane, the azimuth of the base station antenna 10 may be $\alpha+\beta$.

It may be understood that an order of performing step S701 to step S703 is merely an example. In some other embodiments, the order of performing the steps may be changed, or some steps may be split and combined. This is not limited herein.

It may be understood that, in some other embodiments, step S701 to step S703 may alternatively be performed by another unit or module. For example, at least one of the RRU 70, the BBU 80, or the base station network management system 90 performs all or some content of the foregoing steps. This is not limited herein.

According to the method provided in some embodiments of this application, the AISU 20 may determine the azimuth of the base station antenna 10 without obtaining the latitude data of the location of the gyroscope 231, and impact of a drift error of the gyroscope 231 on a measurement result can be eliminated. In this way, precision of the azimuth of the base station antenna 10 measured by the AISU 20 can be further improved.

Embodiments of a mechanism disclosed in this application may be implemented in hardware, software, firmware, or a combination of these implementation methods. Embodiments of this application may be implemented as a computer program or program code executed on a programmable system. The programmable system includes at least one processor, at least one storage system (including volatile and non-volatile memories and/or a storage element), at least one input device, and at least one output device.

The program code may be used for inputting instructions, to perform functions described in this application and generate output information. The output information may be applied to one or more output devices in a known manner. For a purpose of this application, a processing system includes any system having a processor such as a DSP, a microcontroller, an application-specific integrated circuit (ASIC), or a MCU.

The program code may be implemented in a high-level procedural language or an object-oriented programming language, to communicate with the processing system. The program code may be alternatively implemented in an assembly language or a machine language when needed. The mechanisms described in this application are not limited to a scope of any particular programming language. The language may be a compiled language or an interpreted language.

In some cases, the disclosed embodiments may be implemented in hardware, firmware, software, or any combination thereof. The disclosed embodiments may alternatively be implemented as instructions carried by or stored on one or more temporary or non-temporary machine-readable (for example, computer-readable) storage media, and the instructions may be read and executed by one or more processors. For example, the instructions may be distributed through a network or another computer-readable medium. Therefore, the machine-readable medium may include any mechanism for storing or transmitting information in a machine (for example, a computer) readable form, including but not limited to a floppy disk, a compact disc, an optical disc, a read-only memory (CD-ROM), a magnetic optical disk, ROM, RAM, an erasable programmable read-only memory (EPROM), an electrically erasable programmable read-only memory (EEPROM), a magnetic card, an optical card, a flash memory, or a tangible machine-readable memory configured to transmit information through internet by using electricity, light, sound or another form of propagating signal (for example, carrier, an infrared signal, or a digital signal). Therefore, the machine-readable medium includes any type of machine-readable medium that is suitable for storing or transmitting electronic instructions or information in a machine-readable (for example, a computer-readable) form.

In the accompanying drawings, some structural or method features may be shown in a particular arrangement and/or order. However, it should be understood that such a particular arrangement and/or order may not be needed. In some embodiments, these features may be arranged in a manner and/or order different from those/that shown in the illustrative accompanying drawings. In addition, inclusion of structural or method features in a particular figure does not imply that such features are needed in all embodiments, and in some embodiments, these features may not be included or may be combined with other features.

It should be noted that the units/modules mentioned in the device embodiments of this application may be logical divisions. Physically, one logical unit/module may be one physical unit/module, may be a part of one physical unit/module, or may be implemented by using a combination of a plurality of physical units/modules. A combination of functions implemented by these logical units/modules is a key to resolving technical issues proposed in this application. In addition, to highlight the innovative part of this application, a unit/module that is not closely related to resolving the technical issues proposed in this application is not introduced in the foregoing device embodiments of this application. This does not mean that there are no other units/modules in the foregoing device embodiments.

It should be noted that in the examples and the specification of this patent, relational terms such as first and second are merely used to distinguish one entity or operation from another entity or operation, and do not require or imply that any actual relationship or order exists between these entities or operations. Moreover, terms "include", "comprise", or any other variants thereof are intended to cover a non-exclusive inclusion, so that a process, a method, an article, or a device that includes a series of elements includes those elements, and also includes other elements that are not expressly listed, or further includes elements inherent to this process, method, article, or device. An element preceded by a statement "includes a" does not, without more constraints, preclude the presence of additional identical elements in the process, method, article, or device that includes the element.

Although this application has been illustrated and described with reference to some embodiments of this application, a person of ordinary skill in the art should understand that various changes may be made to this application in form and detail without departing from the spirit and scope of this application.

What is claimed is:

1. A method for measuring an azimuth of a base station antenna, wherein the method comprises:

obtaining angular velocity data measured by an angular motion detection apparatus that is stationary relative to a base station antenna, and determining, based on the angular velocity data, a first position relationship between a direction of a sensitive axis of the angular motion detection apparatus and a true north direction;

wherein the sensitive axis of the angular motion detection apparatus is parallel to a horizontal plane on which the base station antenna is located, and wherein obtaining the angular velocity data comprises rotating the angular motion detection apparatus on the horizontal plane to a plurality of preset directions, and obtaining the angular velocity data measured when the angular motion detection apparatus is located in each of the plurality of preset directions; and determining an azimuth of the base station antenna based on the first position relationship and a second position relationship, wherein the second position relationship is a position relationship between the direction of the sensitive axis of the angular motion detection apparatus and a direction of a main lobe of the base station antenna.

2. The method according to claim 1, wherein the first position relationship between the direction of the sensitive axis of the angular motion detection apparatus and the true north direction is determined based on an included angle $\alpha$, and wherein $\alpha$ is determined based on the angular velocity data measured by the angular motion detection apparatus, an angular velocity of Earth's rotation, and a latitude of a location of the angular motion detection apparatus.

3. The method according to claim 2, wherein the determining of an azimuth of the base station antenna based on the first position relationship and the second position relationship comprises:

when the direction of the sensitive axis of the angular motion detection apparatus is the same as a direction of a projection of the direction of the main lobe of the base station antenna on the horizontal plane, determining that the azimuth of the base station antenna is $\alpha$; or when there is an included angle $\beta$ between the direction of the sensitive axis of the angular motion detection apparatus and the direction of the projection of the direction of the main lobe of the base station antenna on the horizontal plane, determining that the azimuth of the base station antenna is $\alpha+\beta$.

4. The method according to claim 1, further comprising:

obtaining a third position relationship between each preset direction and the direction of the sensitive axis of the angular motion detection apparatus that is measured before the rotation of the angular motion detection apparatus.

5. The method according to claim 4, wherein the determining, based on the angular velocity data, of the first position relationship between the direction of the sensitive axis of the angular motion detection apparatus and the true north direction comprises:

determining, based on the third position relationship and the angular velocity data, the first position relationship between the direction of the sensitive axis of the angular motion detection apparatus that is measured before the rotation of the angular motion detection apparatus and the true north direction.

6. The method according to claim 5, wherein the plurality of preset directions comprise:

a first preset direction that is the same as the direction of the sensitive axis of the angular motion detection apparatus that is measured before the rotation of the angular motion detection apparatus;

a second preset direction that forms a counterclockwise included angle of 90° with the first preset direction;

a third preset direction that forms a counterclockwise included angle of 180° with the first preset direction; and a fourth preset direction that forms a counterclockwise included angle of 270° with the first preset direction.

7. The method according to claim 6, wherein the first position relationship between the direction of the sensitive axis of the angular motion detection apparatus and the true north direction is determined based on an included angle α, and wherein α is determined based on angular velocity data of the angular motion detection apparatus in the first preset direction, angular velocity data of the angular motion detection apparatus in the second preset direction, angular velocity data of the angular motion detection apparatus in the third preset direction, and angular velocity data of the angular motion detection apparatus in the fourth preset direction.

8. The method according to claim 7, wherein the determining of the azimuth of the base station antenna based on the first position relationship and the second position relationship comprises:

when the direction of the sensitive axis of the angular motion detection apparatus is the same as the direction of the projection of the direction of the main lobe of the base station antenna on the horizontal plane, determining that the azimuth of the base station antenna is α; or when there is an included angle β between the direction of the sensitive axis of the angular motion detection apparatus and the direction of the projection of the direction of the main lobe of the base station antenna on the horizontal plane, determining that the azimuth of the base station antenna is α+β.

9. The method according to claim 1, wherein the angular motion detection apparatus is disposed on the base station antenna.

10. The method according to claim 1, wherein the angular motion detection apparatus comprises a gyroscope.

11. An apparatus for measuring an azimuth of a base station antenna, comprising:

a memory, configured to store instructions executed by one or more processors of the apparatus; and a processor, wherein the processor is one of the processors of the apparatus, and is configured to run the instructions, so that the apparatus is enabled to implement:

obtaining angular velocity data measured by an angular motion detection apparatus that is stationary relative to a base station antenna, and determining, based on the angular velocity data, a first position relationship between a direction of a sensitive axis of the angular motion detection apparatus and a true north direction;

wherein the sensitive axis of the angular motion detection apparatus is parallel to a horizontal plane on which the base station antenna is located, and wherein obtaining the angular velocity data comprises rotating the angular motion detection apparatus on the horizontal plane to a plurality of preset directions, and obtaining the angular velocity data measured when the angular motion detection apparatus is located in each of the plurality of preset directions; and determining an azimuth of the base station antenna based on the first position relationship and a second position relationship, wherein the second position relationship is a position relationship between the direction of the sensitive axis of the angular motion detection apparatus and a direction of a main lobe of the base station antenna.

12. The apparatus according to claim 11, wherein the angular motion detection apparatus is disposed on the base station antenna.

13. A base station, comprising:

at least one base station antenna;

at least one angular motion detection apparatus;

a memory, configured to store instructions executed by one or more processors of the base station; and a processor, wherein the processor is one of the processors of the base station, and is configured to run the instructions to obtain angular velocity data from the at least one angular motion detection apparatus, to measure an azimuth of the at least one base station antenna by:

obtaining angular velocity data measured by an angular motion detection apparatus that is stationary relative to a base station antenna, and determining, based on the angular velocity data, a first position relationship between a direction of a sensitive axis of the angular motion detection apparatus and a true north direction;

wherein the sensitive axis of the at least one angular motion detection apparatus is parallel to a horizontal plane on which the base station antenna is located, and wherein obtaining the angular velocity data comprises rotating the angular motion detection apparatus on the horizontal plane to a plurality of preset directions, and obtaining the angular velocity data measured when the at least one angular motion detection apparatus is located in each of the plurality of preset directions; and determining an azimuth of the base station antenna based on the first position relationship and a second position relationship, wherein the second position relationship is a position relationship between the direction of the sensitive axis of the angular motion detection apparatus and a direction of a main lobe of the base station antenna.

14. The base station according to claim 13, wherein the angular motion detection apparatus is disposed on the base station antenna.

15. The method according to claim 1, wherein the angular motion detection apparatus is rotated on the horizontal plane using a motor and a transmission mechanism that transfers torque from the motor to the angular motion detection apparatus.

16. The method according to claim 1, wherein the angular motion detection apparatus is disposed within a remote control unit (RCU) of the base station antenna, and wherein the angular motion detection apparatus is rotated on the horizontal plane using a motor of the RCU.

17. The apparatus according to claim 11, further comprising:

a motor; and a transmission mechanism configured to transfer torque from the motor to the angular motion detection apparatus to rotate the angular motion detection apparatus on the horizontal plane.

18. The apparatus according to claim 11, wherein the angular motion detection apparatus is disposed within a remote control unit (RCU) of the base station antenna, and wherein the apparatus further comprises a motor of the RCU configured to rotate the angular motion detection apparatus on the horizontal plane.

19. The base station according to claim 13, further comprising:

a motor; and a transmission mechanism configured to transfer torque from the motor to the at least one angular motion detection apparatus to rotate the at least one angular motion detection apparatus on the horizontal plane.

20. The base station according to claim 13, wherein the at least one angular motion detection apparatus is disposed within a remote control unit (RCU) of the base station, and wherein the base station further comprises a motor of the RCU configured to rotate the at least one angular motion detection apparatus on the horizontal plane.

* * * * *